United States Patent

[11] 3,581,218

[72] Inventor Bill J. Ransdell
1915 24th St., Moline, Ill. 61265

[21] Appl. No. 755,319
[22] Filed Aug. 26, 1968
[45] Patented May 25, 1971

[54] SMOOTHLY ACTING SIGNAL COMPARATOR
7 Claims, 6 Drawing Figs.

[52] U.S. Cl. ........................................................ 328/146,
307/235, 328/147, 330/30, 330/69
[51] Int. Cl. ........................................................ G06g 7/14,
H03b 3/02, H03k 5/20
[50] Field of Search ............................................ 307/235,
290; 330/30 (D), 30, 69; 328/115, 146—149, 150

[56] References Cited

UNITED STATES PATENTS

| | | | |
|---|---|---|---|
| 2,992,340 | 7/1961 | Floyd .......................... | 307/235 |
| 3,018,386 | 1/1962 | Chase .......................... | 307/290X |
| 3,281,608 | 10/1966 | Doyle .......................... | 307/235 |
| 3,294,981 | 12/1966 | Bose .......................... | 307/290X |
| 3,316,423 | 4/1967 | Hull .......................... | 307/235X |
| 3,341,747 | 9/1967 | Halfhill et al. ................ | 307/290X |
| 3,358,218 | 12/1967 | Halpin .......................... | 307/284X |
| 3,449,687 | 6/1969 | Knauber et al. .............. | 330/30 |

*Primary Examiner*—Stanley D. Miller, Jr.
*Attorney*—Meyer, Tilberry and Body

ABSTRACT: There is provided a signal monitoring circuit, for use with a signal source having a high internal impedance, for providing an output signal when a received input signal attains a predetermined value relative to a comparison signal, including means for developing the comparison signal; and, bistable circuit means having an input circuit for receiving the input signal, and an output circuit. The bistable circuit means being normally in a first condition and being actuated to a second condition when the input signal attains the predetermined value relative to the comparison signal, whereupon the output circuit carries an output signal. The signal monitoring circuit includes an improvement for positively actuating the bistable circuit from the first condition to the second condition so that the output signal is characterized by substantially continuously varying from a first level to a second level, wherein the improvement comprises circuit means coupling the output circuit to the comparison signal developing means for varying the value of the comparison signal in dependence upon the value of the output signal so as to increase the actuation time required to place the bistable means in the second condition.

Figure 1:
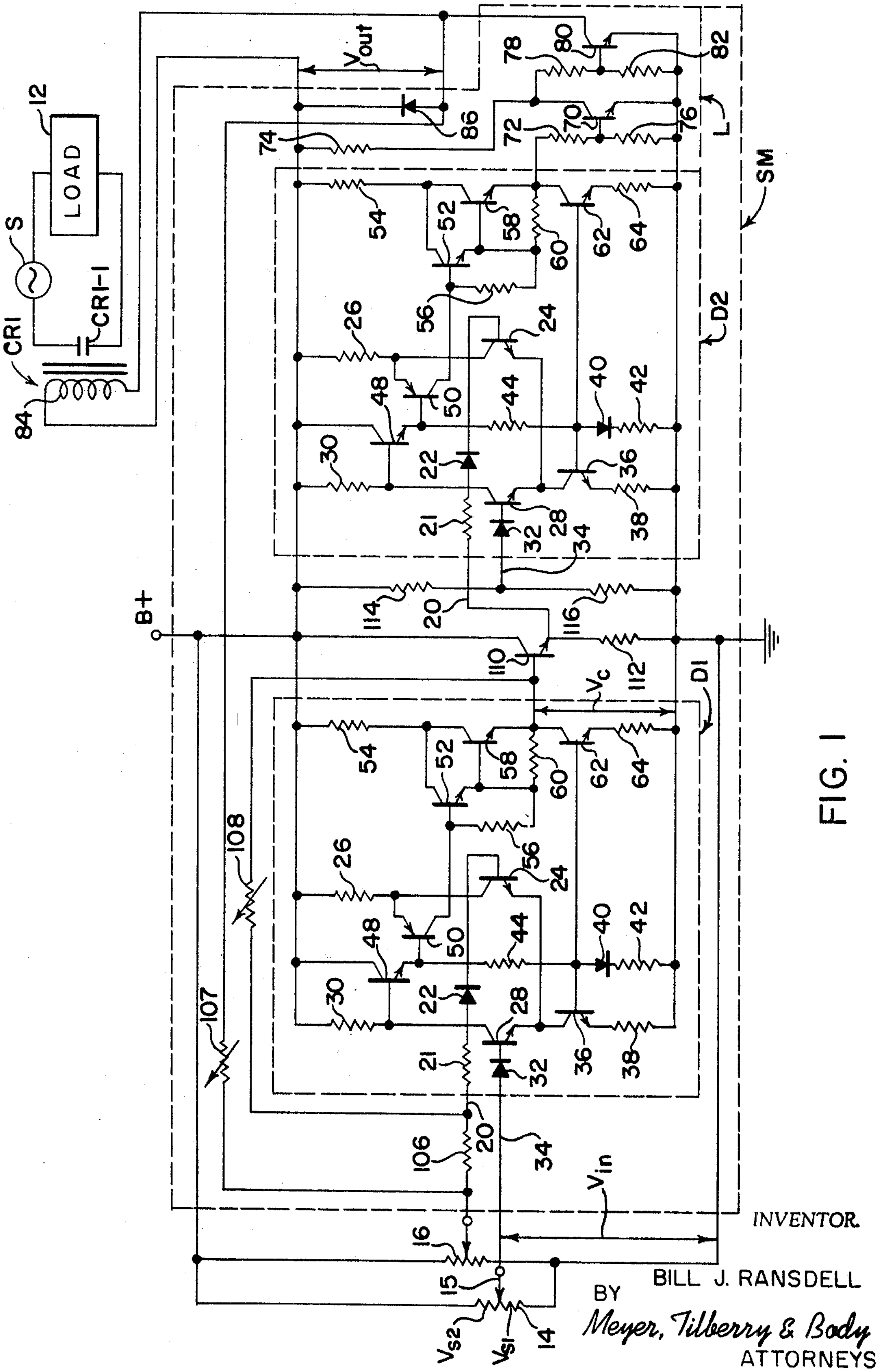

INVENTOR.
BILL J. RANSDELL
BY
Meyer, Tilberry & Body
ATTORNEYS

INVENTOR.
BILL J. RANSDELL
BY
Meyer, Tilberry & Body
ATTORNEYS

SMOOTHLY ACTING SIGNAL COMPARATOR

This invention is directed toward the art of circuits for providing an output signal upon receipt of a preselected input signal, and, more particularly, to bistable circuits for providing an output signal when the voltage of the input signal attains a value equal to a predetermined value.

The invention is particularly applicable in conjunction with a high-impedance potentiometer connected across a voltage source and will be particularly described in conjunction therewith; although, it may be appreciated that the invention has broader applications and may, for example, be used with any circuit having a variable output signal, such as an amplifier.

Comparator circuits are well known in the art of electronics. Such circuits, for example, include differential amplifiers in which the circuit changes from a first condition to a second condition in response to a preselected voltage input signal to thereby provide an output signal. One problem encountered with circuits of this type is that as the circuit changes from the first condition to the second condition, the input impedance of the circuit varies over a wide range. When the input circuit of a conventional comparator circuit is connected across a voltage source having a relatively low internal impedance, the variation in input impedance of the comparator circuit has relatively little effect on the voltage developed by the source. However, in applications where it is desirable to limit the total current consumed by the system, it is often desirable to connect a high-impedance potentiometer across a voltage source to develop a variable signal. When conventional comparator circuits were coupled to high-impedance potentiometers, at approximately the voltage level at which the comparator circuit changed from the first condition to the second condition, the circuit would begin oscillating and fail to provide a usable output signal. The reason for this oscillating condition was that as the comparator circuit changed from the first condition to the second condition, the input impedance changed abruptly from a very high value to a relatively low value. When the comparator circuit switched to the low input-impedance condition, the circuit has the effect of loading the potentiometer to thereby decrease the voltage developed by the potentiometer. As the voltage developed by the potentiometer decreased, the comparator reverted to the first or high impedance condition. Upon reverting to the first condition, the load across the potentiometer was effectively removed; therefore, the voltage developed by the potentiometer increased and the comparator circuit was switched back to the second state. As may be readily apparent, the comparator circuit oscillated between the first and second condition, and provided an oscillating output signal which was undesirable for a switching operation.

The present invention contemplates a new and improved signal monitoring circuit which overcomes all of the above referred-to problems, and others, and provides a circuit which is simple in construction.

In accordance with the present invention there is provided a signal monitoring circuit, for use with a signal source having a high internal impedance, for providing an output signal when a received input signal attains a predetermined value relative to a comparison signal, including means for developing the comparison signal; and, bistable circuit means having an input circuit for receiving the input signal, and an output circuit. The bistable circuit means being normally in a first condition and being actuated to a second condition when the input signal attains the predetermined value relative to the comparison signal, whereupon the output circuit carries an output signal. The signal monitoring circuit includes an improvement for positively actuating the bistable circuit from the first condition to the second condition so that the output signal is characterized by substantially continuously varying from a first level to a second level, wherein the improvement comprises circuit means coupling the output circuit to the comparison signal developing means for varying the value of the comparison signal in dependence upon the value of the output signal so as to increase the actuation time required to place the bistable means in the second condition.

In accordance with a more limited aspect of the present invention, the output circuit means of the bistable circuit means is also coupled to a second bistable circuit means having a first condition and a second condition, means for developing a comparison signal, and an output circuit means for providing a second output signal upon actuation of the second bistable circuit means to the second condition, the second bistable means being responsive to the value of the first output signal so that the condition of the second bistable circuit means is dependent upon a particular relationship between the value of the first output signal and the value of the comparison signal of the second bistable circuit means.

In accordance with a still more limited aspect of the present invention, the output circuit of the second bistable circuit is coupled to the means for developing a comparison signal of the first bistable circuit means for varying the value of the comparison signal of the first bistable circuit means as the second bistable circuit means is actuated from one condition to the other condition so that the first bistable circuit is positively actuated from the first condition to the second condition.

The principle object of the present invention is to provide a signal monitoring circuit for providing an output signal upon receipt of an input signal of a predetermined value.

Another object of the present invention is to provide a signal monitoring circuit which switches positively from one condition to another, and in which oscillations during switching are substantially eliminated.

Another object of the present invention is to provide a signal monitoring circuit in which the input signal may be developed by a variable voltage source having a relatively high internal impedance.

A still further object of the present invention is to provide a signal monitoring circuit in which the input signal may be developed by a relative high-impedance potentiometer, such as a thin-film carbon rectilinear potentiometer, connected across a voltage source, so that the current required to develop the input signal is relatively low.

A still further object of the invention is to provide a signal monitoring circuit in which the output signal switches positively from approximately a ground potential to a positive or negative potential.

The foregoing objects and other advantages of the invention will become more readily apparent from the following description of the preferred embodiment as illustrated in the accompanying drawing wherein:

FIG. 1 is a schematic illustration of the preferred embodiment of a signal monitoring circuit coupled through a normally open relay to a load:

FIGS. *2a* and *2b* illustrate generally the waveforms of an input signal and output signal of a conventional differential amplifier employed as a comparator circuit; and, FIGS. *2c* through *2e* illustrate generally various waveforms of the signal monitoring circuit of FIG. 1.

Reference is now made to FIG. 1 which illustrates the preferred embodiment of a signal monitoring circuit SM which includes a pair of potentiometers 14 and 16, a detector circuit D1, a detector circuit D2, and a load circuit L. Numerous circuits such as that illustrated in FIG. 1 are employed in an overall control system, such as an industrial process control system; therefore, potentiometer 14 is preferably of a very high impedance so that a smaller direct-current power supply may be employed to supply the total current requirements for the system. Potentiometer 14 may be employed as a position-indicating device, such that when the movable arm 15 of potentiometer 14 reaches a preselected position, monitoring circuit SM will provide an output signal to close a set of contacts CR1–1 of relay CR1 to thereby energize a load. Potentiometer 14 preferably takes the form of a high impedance thin-film carbon resistor such as a Linear Motion Precision Super Con Film Potentiometer, Precision Carbon Film Rectilinear Potentiometer Model III, Manufactured by Computer Instruments Corporation of New York. A potentiometer of this type provides improved resolution and accuracy, and precise control.

DETECTOR CIRCUITS

Reference is now made to FIG. 1 which schematically illustrates a pair of detector circuits D1 and D2, which are basically similar circuits, and therefore corresponding elements of these circuits will be denoted with the same numeral, and a single description will be presented therefor. Detector circuits D1 and D2 include an inverting input terminal 20 which is connected through a resistor 21 to the anode of a diode 22 having its cathode connected to the base of an NPN transistor 24. The collector of transitor 24 is connected through a resistor 26 to the B+ supply source, and the emitter of this transistor is connected directly to the emitter of a NPN transistor 28. The collector of transistor 28 is connected through a resistor 30 to the B+ supply source, and the base of this transistor is connected to the cathode of a diode 32. The anode of diode 32 is connected to a noninverting input terminal 34. Also connected to the emitter of transistor 28 is the collector of an NPN transistor 36, having its emitter connected through a resistor 38 to ground. The base of transistor 36 is connected to the anode of a diode 40, having its cathode connected through a resistor 42 to ground. The base of transistor 36 is also connected through a resistor 44 to the emitter of an NPN transistor 48, and the base of this transistor is connected to the collector of transistor 28. The collector of transistor 48 is connected directly to the B+ supply source.

Also connected to the emitter of transistor 48 is the base of a PNP transistor 50, having its emitter connected to the collector of transistor 24. The collector of transistor 50 is connected to the base of an NPN transistor 52, and the collector of transistor 52 is connected through a resistor 54 to the B+ supply source. Also connected to the base of transistor 52 is a resistor 56 which is in turn connected to the emitter of this transistor. The emitter of transistor 52 is also connected to the base of an NPN transistor 58 having its collector connected directly to the collector of transistor 52. The emitter of transistor 58 is connected through a resistor 60 to the base of this transistor, and to the emitter of transistor 52. Also connected to the emitter of transistor 58 is the collector of an NPN transistor 62 having its emitter connected through a resistor 64 to ground. The base of transistor 62 is connected directly to the base of transistor 36.

LOAD CIRCUIT

Load circuit L includes an NPN transistor 70 having its base connected through a resistor 72 to the collector of transistor 62 of detector circuit D2. Connected through a resistor 74 to the B+ supply source is the collector of transistor 70, and the emitter of this transistor is connected directly to ground. The base of transistor 70 is also connected through a resistor 76 to ground. Also connected to the collector of transistor 70 is a resistor 78 which is in turn connected to the base of an NPN transistor 80. The emitter of transistor 80 is connected directly to ground, and the base of this transistor is connected through a resistor 82 to ground. The collector of transistor 80 is connected through the coil 84 of relay CR1 to the B+ supply source, and is also connected to the anode of a diode 86 having its cathode connected directly to the B+ supply source. Relay CR1 includes a set of normally open contacts CR1–1 which are connected in series with an alternating voltage source S and a load 12.

ASSOCIATED CIRCUITRY

Connected to the noninverting input terminal 34 of detector circuit D1 is the movable arm 15 of potentiometer 14, and as illustrated in FIG. 1, the stationary terminals of this potentiometer are connected between the B+ supply source and ground. Also connected between the B+ supply source and ground is potentiometer 16, having its movable arm connected through a resistor 106 to the inverting input terminal 20 of detector circuit D1. The movable arm of potentiometer 16 is also connected through a potentiometer 107 to the collector of transistor 80, and the inverting input terminal 20 of detector circuit D1 is connected through a potentiometer 108 to the collector of transistor 62 of differential amplifier D1.

The collector of transistor 62 of detector circuit D1 is also connected directly to an NPN transistor 110, having its collector connected to the B+ supply source. The emitter of transistor 110 is connected through a resistor 112 to ground, and to the inverting input terminal 20 of detector circuit D2. Noninverting input terminal 34 of detector circuit D2 is connected through a resistor 114 to the B+ supply source, and through a resistor 116 to ground.

OPERATION

In the preferred embodiment of the present invention, as is illustrated in FIG. 1, the voltage applied to the noninverting input terminal 34 of detector D1 is developed across a potentiometer 14; however, it may be appreciated that this voltage may be developed by various other circuit arrangements for example, solid-state developed across the terminals of a capacitor in a resistor-capacitor type timing circuit.

As the arm of potentiometer 14 is moved from the bottom portion of the potentiometer, a point will be reached at which the voltage applied to the noninverting input 34 attains a value equal to a comparison voltage set into detector circuit D1. Transistor 28 will then be biased into conduction and transistor 24 will be reverse biased. The comparison voltage of detector circuit D1 is varied by changing the movable arm of potentiometer 16 to thereby adjust the bias voltage applied to transistor 24.

When transistor 28 becomes forward biased, a binary "0" signal will be applied to the base of transistor 48 thereby reverse biasing this transistor. By a binary "0" signal is meant a signal approximately equal to ground potential, or a slightly negative voltage, and by a binary "1" signal is meant a signal equal to some positive voltage potential. When transistor 48 is reverse biased, a binary "0" signal will be applied to the base of transistor 50 to thereby forward bias this transistor into conduction. When transistor 50 becomes conductive, a binary "1" signal will be applied to the base of transistor 52, which in turn will cause a binary "1" signal to be applied to the base of transistor 58. Upon application of a binary "1" signal to the base of transistor 58, this transistor will become forward biased to thereby apply a binary "1" signal to the base of transistor 110.

When a binary "1" signal is applied to the base of transistor 110, this transistor will become forward biased, thereby applying a binary "1" signal to the inverse input terminal 20 of detector circuit D2. Upon application of a binary "1" signal to the inverting input terminal 20, transistor 24 of detector circuit D2 will become forward biased, thereby reverse biasing transistor 28. The voltage level at which transistor 24 of detector circuit D2 is forward biased, is determined by the values of resistors 114 and 116. As transistor 28 becomes reverse biased, a binary "1" signal will be applied to the base of transistor 48 to thereby forward bias this transistor into conduction, which in turn will cause a binary "1" signal to be applied to the base of transistor 50. Upon application of a binary "1" signal to the base of transistor 50, this transistor will become reverse biased to thereby apply a binary "0" signal to the base of transistor 52. The application of a binary "0" signal to the base of transistor 52 will cause a binary "0" signal to be applied to the base of transistor 58, which will cause this transistor to become reverse biased. When transistor 58 is reverse biased, a binary "0" signal will be applied to the base of transistor 70 thereby reverse biasing this transistor. When transistor 70 becomes reverse biased, a binary "1" signal will be applied to the base of transistor 80 to thereby forward bias this transistor into conduction. As transistor 80 becomes conductive, a current will flow through the coil of relay CR1 to cause normally open contacts CR1–1 to close, thereby energizing load 120.

When detector circuit D1 switches from a first condition, or "off" state, to a second condition, or "on" state, the input impedance changes from a very high impedance to a relatively low impedance. The voltage developed at arm 15 of potentiometer 14, which is preferably a very high impedance potentiometer, will be of a substantially lower value after switching has occurred than the value prior to switching.

The feedback circuit including potentiometer 108 prevents detector circuit D1 from switching abruptly from the first condition to the second condition to thereby prevent the circuit from oscillating between the two condition as switching occurs. The feedback circuit provides degenerative feedback which tends to cause detector circuit D1 to revert to the first condition as the circuit commences to change from the first condition to the second condition. For example, when the voltage developed at arm 15 of potentiometer 14 begins to forward bias transistor 28, transistor 24 commences to become reverse biased. As transistor 28 begins to be conductive, the collector of transistor 62 commences to develop a positive signal, which is fed back through resistor 108 to the noninverting input terminal 20. This increasingly positive signal is applied to the base of transistor 24 and causes this transistor to become less reverse biased or more conductive, which in turn causes transistor 28 to become less forward biased or less conductive. As may be seen, the feedback signal has the net effect of increasing the switching time, or expanding the period of time required for detector circuit D1 to switch from one condition to the other condition.

Figure 2A:
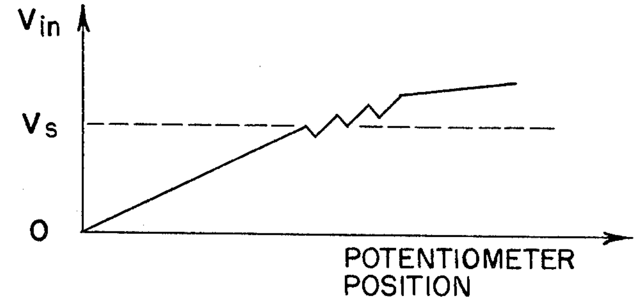
FIG. 2a (PRIOR ART)
Figure 2B:
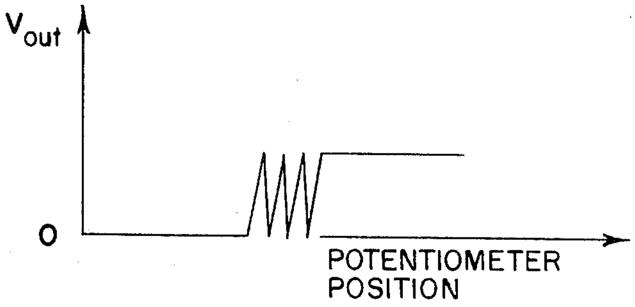
FIG. 2b (PRIOR ART)
Figure 2C:
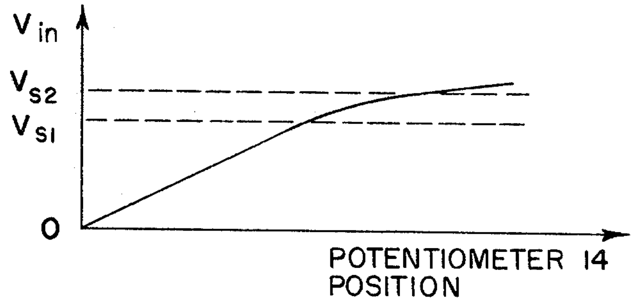

Reference is now made to FIGS. 2a and 2b which illustrate what is believed to be the signal wave forms of a conventional differential-amplifier comparator circuit when the input terminals thereof are coupled to a variable voltage source having a relatively high internal impedance. Thus as is illustrated in FIG. 2a, if the input terminal of a conventional comparator circuit is coupled to the movable arm of a high-impedance potentiometer, as the position of the arm of the potentiometer is moved from ground potential toward a B+ source supply, the voltage across the input terminals increases approximately linearly until the comparator circuit commences to switch from the first condition to the second condition. Upon switching to the second condition, the relatively low input impedance of the comparator circuit has the effect of "loading" the potentiometer thereby causing the voltage developed by the potentiometer to abruptly decrease in value. As the voltage applied to the input terminal decreases in value, a point is reached at which the comparator reverts to the first condition. Upon switching back to the first condition, the input impedance of the comparator is again a relatively high impedance, i.e. the "load" applied to the potentiometer is effectively removed, and the input voltage increases abruptly. When the voltage applied to the input terminals again increases, the comparator circuit will again switch to the second condition. As is readily apparent, these abrupt changes in voltage cause the circuit to switch between conditions, or oscillate until the arm of the potentiometer is moved to a position at which the voltage developed by the potentiometer, when "loaded", is of such a value that the comparator circuit will remain actuated to the second condition. Obviously, as the voltage developed by the potentiometer is decreased back through the point of switching, oscillation will again occur. As is illustrated in FIG. 2b, the output signal of a conventional differential-amplifier comparator circuit will generally follow the oscillations of the signal applied to the input terminals during actuation from the first condition to the second condition FIGS. waveforms and 2e illustrate what is believed to be the waveforms of the input and output signals of signal monitoring circuit SM corresponding to the above-described voltage waveforms. FIG. 2c illustrates a waveform of the signal developed by high-impedance potentiometers 14, i.e., the voltage measured between arm 15 of potentiometer 14 and ground, as the arm 15 is moved from the lower position of the potentiometer. Thus, the applied voltage $V_{in}$ increases linearly until a voltage $V_{s1}$ is reached at which transistor 28 becomes slightly conductive. As transistor 28 becomes slightly conductive, transistor 24 becomes slightly reverse biased to thereby cause a slightly positive signal to appear at the collector of transistor 62. This slightly positive signal is fed back through potentiometer 108 to the inverting input terminal 20, thereby tending to forward bias transistor 24. As the signal applied to the base terminal of transistor 24 increases, the comparison signal developed by transistor 24 will be increased. With an increase in the comparison signal, there will be a corresponding increase in the value of the signal required to "trigger" or switch detector circuit from the first condition to the second condition. By increasing the value of the signal required to trigger the bistable detector circuit, the time required to switch between the two conditions is increased, thereby preventing abrupt switching or oscillations from occurring. Thus, as is illustrated in FIG. 2c, the transition of the input signal from the first condition to the second condition, i.e., the segment of the waveform between $V_{s1}$ and $V_{s2}$, is a smooth increase in voltage as the arm 15 of potentiometer passes through this region. Similarly, the voltage $V_{out}$ which appears at the collector of transistor 62 of detector circuit D1 switches positively from a binary "0" signal to a binary "1" signal without the oscillations associated with a conventional differential-amplifier comparator circuit.

Figure 2D:
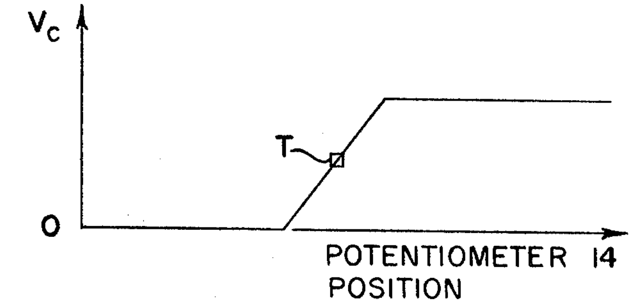
Figure 2E:
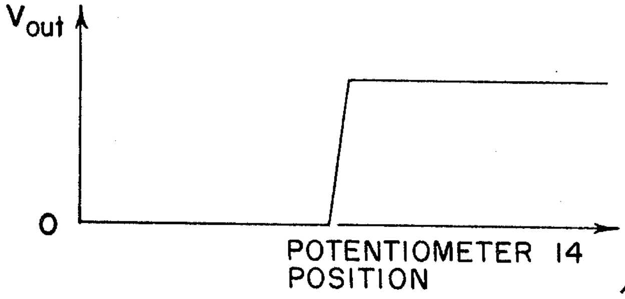

As is illustrated in FIG. 2d, the time required for switching between the two conditions is excessive for many switching functions; therefore, the signal developed at the collector of transistor 62 of detector circuit D1 is applied through an impedance-matching stage including transistor 110 to detector circuit D2. Transistor 24 and 28 of detector circuit D2 are biased so that this bistable circuit will be triggered from one condition to the other condition at some point on the increasing portion of voltage $V_{out}$ as is shown by point T in FIG. 2d.

As may be seen, detector circuit D1 has the effect of modifying the signal developed as the arm 15 of potentiometer 14 passes through the switching region, and detector circuit D2 is biased to operate on this modified slope to thereby provide an output signal $V_R$ which switches abruptly and positively from one condition, i.e., a binary "0" signal to the other condition, i.e., a binary "1" signal.

The regenerative feedback path including potentiometer 107 causes relay CR1 to switch positively from an "off" to an "on" condition. When relay CR1 commences to be energized through transistor 80, a less positive signal is fed back to the inverting input terminal 20 tending to reverse bias transistor 24, thereby maintaining detector circuit D1 in a second condition once switching commences.

Although the invention has been shown in connection with the preferred embodiments, it will be readily apparent to those skilled in the art that various changes in form and arrangement of parts, such as the substitution of various types of variable voltage sources for potentiometer 15, the substitution of a solid-state electronic control device for the electromechanical relay CR1, et cetera, may be made without departing from the spirit and scope of the invention as defined by the appended claims.

Having thus described my invention, I claim:

1. A signal monitoring circuit for providing an output signal when a received input signal attains a predetermined value relative to a comparison signal including:

means for developing said comparison signal;

a bistable circuit means having an input circuit for receiving said input signal, an inverting input for receiving a comparison signal and an output circuit, said bistable circuit means being normally in a first condition and being actuated to a second condition when said input signal attains said predetermined value relative to said comparison signal, whereupon said output circuit carries said output signal; and the improvement for positively actuating said bistable circuit means from said first condition to said second condition so that said output signal is characterized by substantially continuously varying from a first level to a second level wherein said improvement comprises circuit means having a connection to said output circuit and coupled to said comparison signal developing means coupling said output circuit to said comparison signal developing means for varying the value of said comparison signal in dependence upon the value of said output signal so as to increase the actuation time required to place said bistable means in said second condition.

2. A signal monitoring circuit as defined in claim 1 wherein said bistable circuit includes a first and a second electronic control means each having a first and a second condition, and a first, second and control electrode;

said first and second comparator of said first electronic control means being coupled to said first and second electrodes of said second electronic control means, respectively, so that when said first electronic control means is in said first condition said second electronic control means is in said second condition;

said input circuit including said control electrode of said first electronic control means; and, said circuit coupling means coupling said output circuit to said control electrode of said second electronic control means, said means for developing said comparison signal comprising a resistor connected to a source of voltage with a tap thereon coupled to said output circuit.

3. A signal monitoring circuit as defined in claim 2 wherein said second electrode of said second electronic control means is coupled to said output circuit so that when said second electronic control means is in said second condition said output circuit carries said output signal; and, said output circuit is connected directly through a resistance element to said control electrode of said second electronic control means so that a portion of the output signal is fed back to said comparison signal developing means for varying the value of said comparison signal as said second electronic control means is actuated from said first condition to said second condition, a resistor being interposed between said potentiometer tap and said output circuit.

4. A signal monitoring circuit as defined in claim 2 including a second bistable circuit means having an input circuit means coupled to said output circuit means of said first bistable circuit means, and an output circuit means;

said second bistable circuit means having a first and a second condition, and being responsive to said output signal so that when said output signal attains a predetermined value said second bistable circuit means is actuated from said first condition to said second condition.

5. A signal monitoring circuit as defined in claim 4 including a second circuit means coupling said output circuit means of said second bistable circuit means to said means for developing a comparison signal for altering the value of said comparison signal as said second circuit means commences to change from said first condition to said second condition so that said bistable circuit means is actuated positively from said first condition to said second condition.

6. A signal monitoring circuit as defined in claim 5 wherein said second bistable circuit means includes a third and a fourth electronic control means each having a first and a second condition, and a first, second, and control electrode;

said control electrode of said third electronic control means being coupled to said output circuit of said first bistable circuit means, and said first and second electrodes of said third electronic control means being coupled to said first and second electrodes of said fourth electronic control means, respectively, so that when said third electronic control means is in said first condition said fourth electronic control means is in said second condition, said second coupling circuit means comprising a resistor connected between said output circuit means of said second bistable circuit means and said comparison signal potentiometer tap.

7. A signal monitoring circuit as defined in claim 6 including means for developing said input signal; said input signal developing means including a high-impedance thin-film carbon potentiometer, coupled across a voltage supply source.